(12) United States Patent  
Toner, Jr.

(10) Patent No.: US 6,292,371 B1
(45) Date of Patent: Sep. 18, 2001

(54) MULTIPLE CAVITY, MULTIPLE PORT MODULAR CATV HOUSING

(75) Inventor: Robert L Toner, Jr., Maple Glen, PA (US)

(73) Assignee: Toner Cable Equipment, Inc., Horsham, PA (US)

( * ) Notice: Subject to any disclaimer, the term of this patent is extended or adjusted under 35 U.S.C. 154(b) by 0 days.

(21) Appl. No.: 09/427,956

(22) Filed: Oct. 27, 1999

(51) Int. Cl.$^7$ ........................................ H05K 5/00
(52) U.S. Cl. ................. 361/752; 361/753; 361/814; 174/52.1
(58) Field of Search .................. 361/752, 753, 361/827, 828, 814; 174/521; 439/76.1, 579

(56) References Cited

U.S. PATENT DOCUMENTS

| | | | |
|---|---|---|---|
| 3,617,811 | * 11/1971 | Mcvoy | 439/63 |
| 3,989,933 | * 11/1976 | Cauldwell | 439/76.1 |
| 4,755,776 | 7/1988 | Preschutti . | |
| 5,485,350 | 1/1996 | Hecht et al. . | |
| 5,635,881 | 6/1997 | Romerein et al. . | |
| 5,648,745 | 7/1997 | Spriester et al. . | |
| 5,675,300 | 10/1997 | Romerein . | |
| 5,756,935 | 5/1998 | Balanovsky et al. . | |
| 5,763,830 | 6/1998 | Hsueh . | |
| 5,781,844 | 7/1998 | Spriester et al. . | |
| 5,833,481 | * 11/1998 | Inuoe | 439/261 |
| 5,914,863 | * 6/1999 | Shen | 361/752 |
| 6,024,604 | * 2/2000 | Chilton et al. | 439/579 |

* cited by examiner

Primary Examiner—Jeffrey Gaffin
Assistant Examiner—Tuan Dinh
(74) Attorney, Agent, or Firm—Allan Jacobson

(57) ABSTRACT

A multiple cavity, multiple port modular CATV housing permits a plurality of taps, splitters, equalizers and amplifiers to be arranged in various combinations. A plurality of modular cavities is connected in series from a coaxial connector input. Each modular cavity contains a module switch, which provides conductivity between the input and output of each respective modular cavity when the modular cavity is empty, and opened when a plug in module is inserted into the modular cavity. Various flexible electrical and mechanical modular configurations of CATV components are configured by plugging or unplugging desired modules such as subscriber taps of various numbers and values, an amplifier, an equalizer, a terminating load or a mid-module output. Taps with different values may be used in different modular cavities to accommodate longer subscriber drop lines.

18 Claims, 8 Drawing Sheets

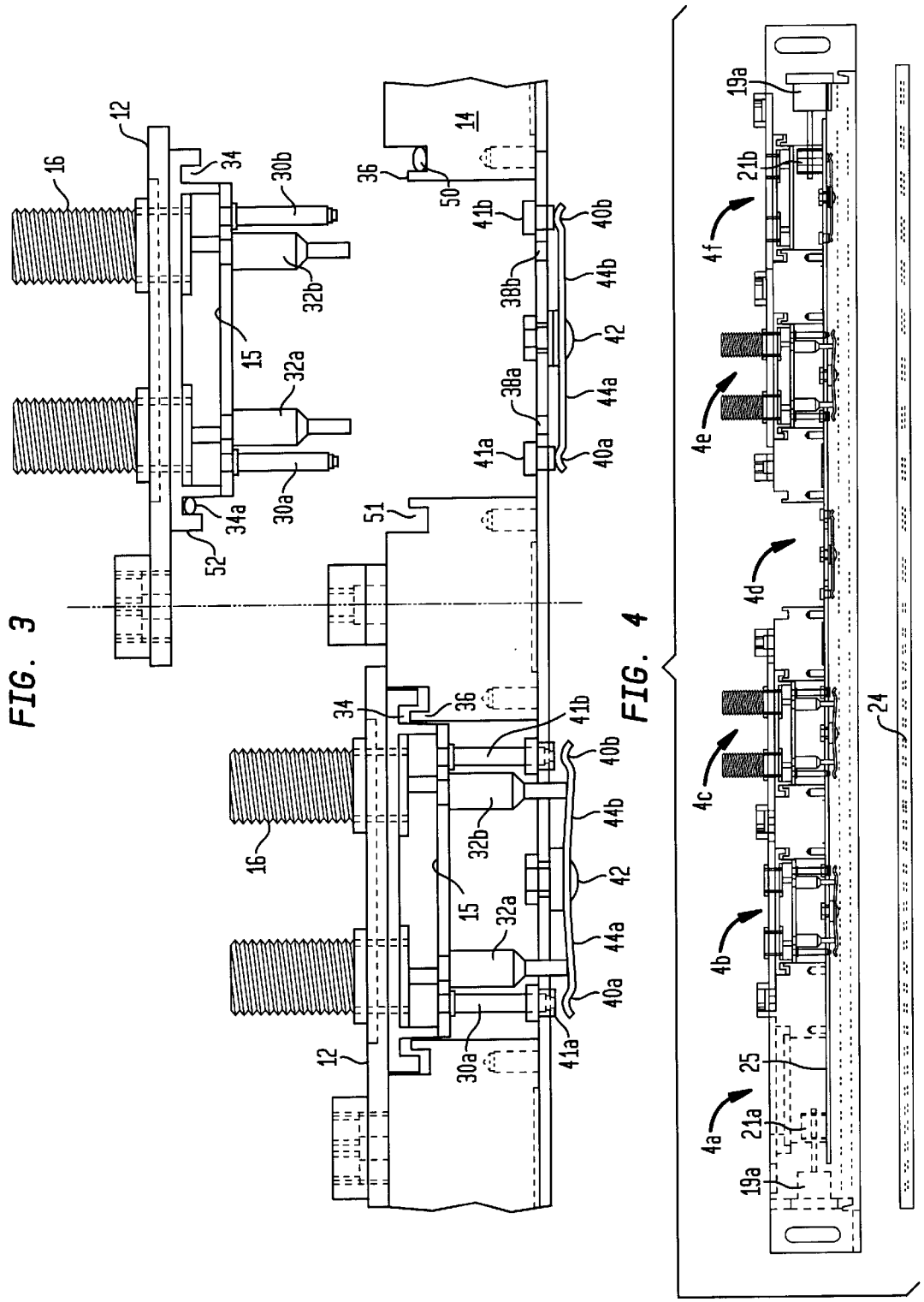

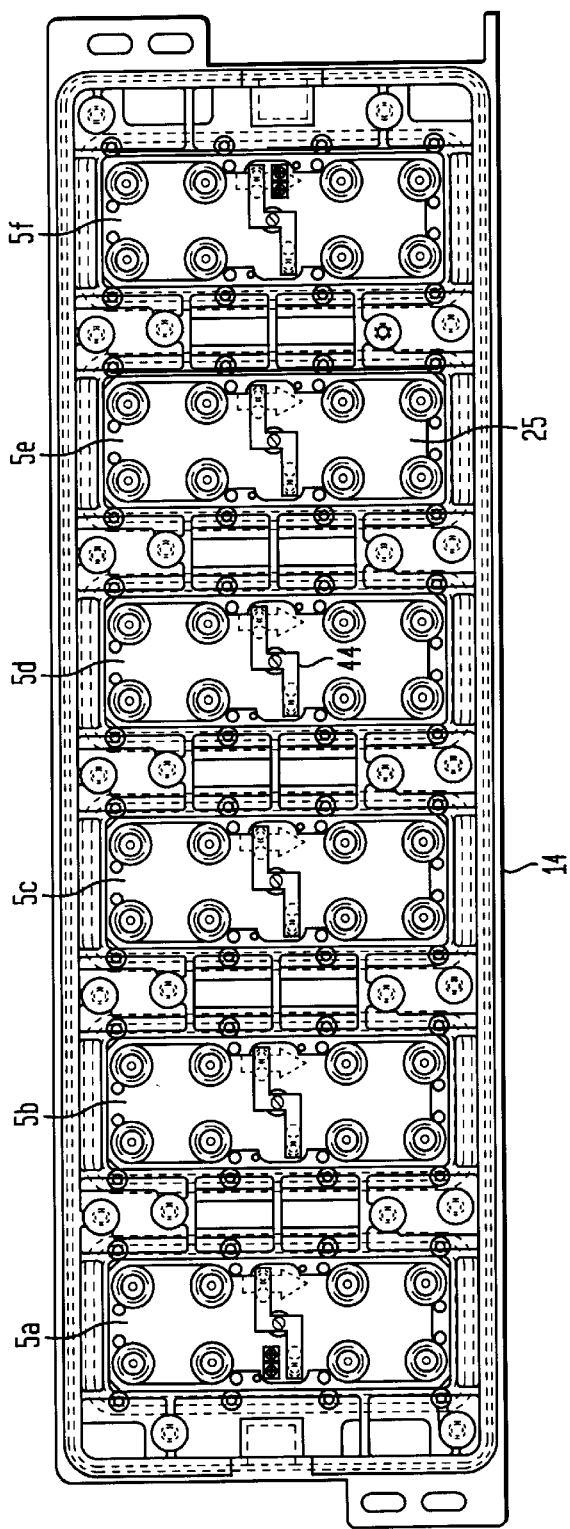
FIG. 5
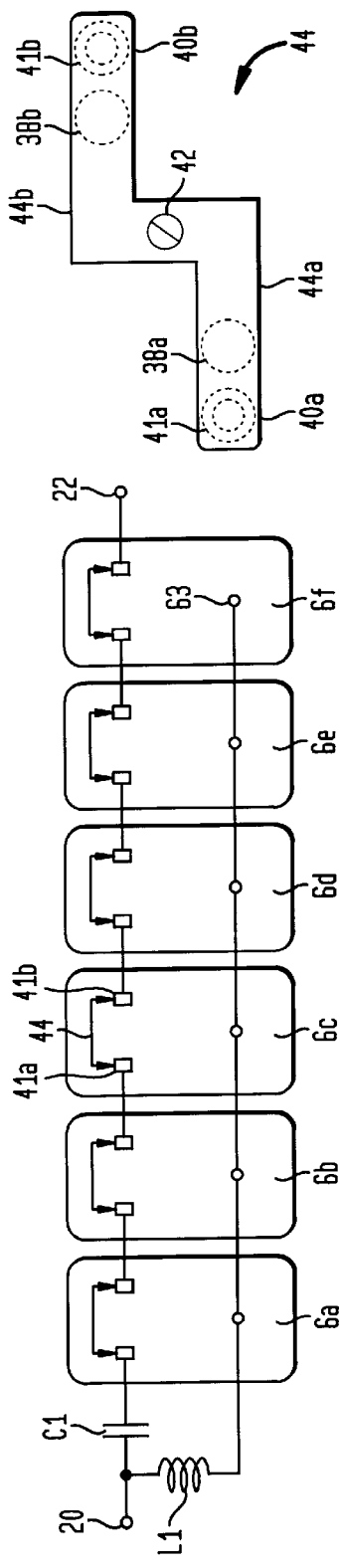
FIG. 7
FIG. 6

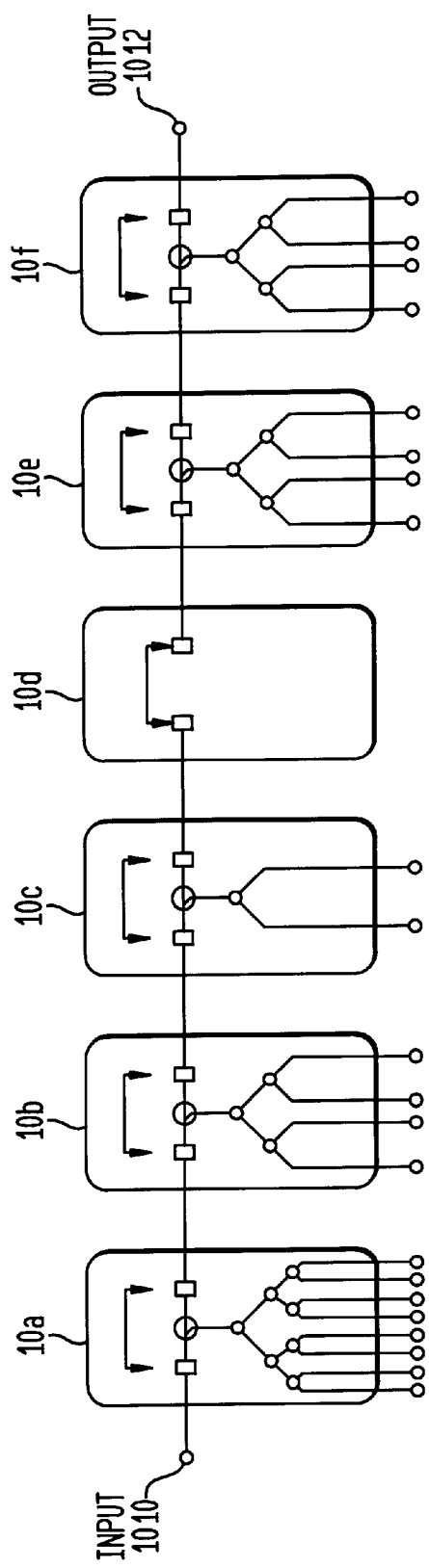
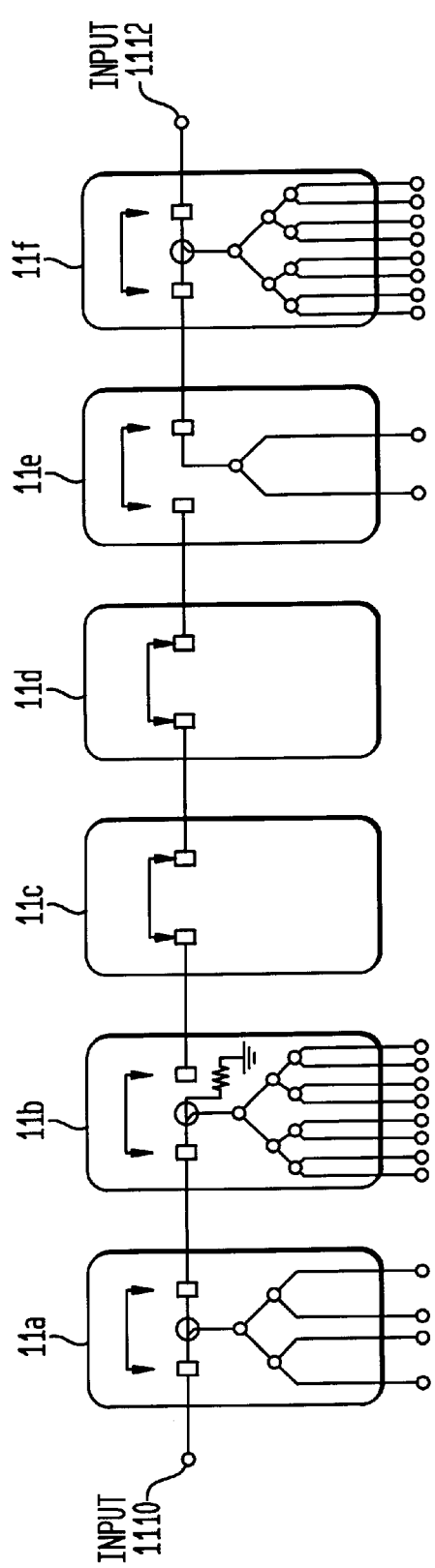

MULTIPLE CAVITY, MULTIPLE PORT MODULAR CATV HOUSING

FIELD OF THE INVENTION

The present invention relates to CATV distribution equipment, and in particular the present invention relates to a multiple port housing for providing flexible electrical and mechanical modular configurations of CATV components such as taps, splitters, equalizers and amplifiers.

BACKGROUND OF THE INVENTION

A cable television (CATV) system distributes a broadband RF signal to individual subscriber locations. The headend originates the RF signal, and the distribution network divides, or distributes, the signal to each subscriber location. Amplifiers and line extenders carry the RF signal to a local distribution point near a group of subscriber locations. A tap is used to "tap" some of the RF signal from the local distribution point and deliver it to the subscriber's home via a coaxial drop cable. Typically, a tap is a 2, 4, or 8 port device, which respectively provides service to 2, 4, or 8 subscriber locations.

Taps vary in both the numbers of subscriber output ports and the level of RF signal (the tap value) that is tapped from the input RF signal. Tap values are expressed in dB of attenuation from the input RF signal. Most taps divert only a portion of the input RF signal to subscriber output ports and pass almost all of the input signal level to the output connector. A directional coupler is not linear in tap value to insertion loss correlation (insertion loss is the signal attenuation from input to output) the higher the tap value the less insertion loss in the directional coupler. A 20 dB directional coupler will only have about 0.8 dB of insertion loss where as a 9 dB directional coupler will have about 2.5 dB of insertion loss Some taps are terminating taps that have subscriber output ports but no output connector.

A typical tap has a directional coupler and an internal splitter network. The directional coupler taps a fixed level of RF signal from the input connector, and passes the tapped RF signal through the internal splitter network. The subscriber output ports are connected to the splitter outputs. The output of the directional coupler is connected to the tap output connector, which couples input RF signal less the directional couplers insertion loss to the next tap in the CATV system. A terminating tap (which has no output connector) includes only a splitter network and subscriber output ports for connection to local subscriber drop lines.

In very dense subscriber locations, it is known to cascade several 2, 4 or 8 port taps together in one location to serve 24, 32 or even 48 homes. In such case, each tap is selected for a desired value and required number of ports. The same tap housing accommodates any one of a variety of possible tap variations. That is, a typical tap housing is designed to hold any one of a number of different tap configurations, and a given line of taps will fit the common tap housing design. To increase the number of subscriber ports at a given location, additional tap housings are added in series.

However, in order to add additional tap housings in series, the downstream side of the CATV system is disconnected, which interrupts service to the downstream subscribers. In addition, as more subscribers are added, amplification and/or equalization of the RF signal may become necessary to avoid loss of quality of the RF signal. Installing an amplifier or equalizer will interrupt service to downstream subscribers. As CATV services upgrade to include advanced services such as telephone or Internet access, even brief interruptions in service is unacceptable.

In areas with a large number of subscribers, it is also known to use large multi-port, multi-value tap configurations that incorporate fixed cascades of 4 and 8 port taps with different tap values in a single housing. Multiple large tap product versions include 16, 32, and 48 port models with bandwidths ranging form 5 MHz to 1000 MHz. Different tap values in one large tap housing permit the use of different lengths of subscriber drop lines while still providing proper signal levels to the television sets.

The advantage of a large multi-port, multi-value tap housing as compared to cascading separate 8-port taps, is that large tap configurations are less expensive, are specifically designed for the application (which enhances the RF performance) and require less space. However, the number of possible large tap variations leads to a large number of product models. Also, during field service, if one of the internal taps or subscriber ports is found to be damaged or defective, the whole multi-port, multi-value large tap may have be replaced.

SUMMARY OF THE INVENTION

The present invention is embodied in a multiple cavity multiple port modular CATV housing in which a plurality of taps, splitters, equalizers and amplifiers may be arranged in various combinations. At least a first coaxial connector is provided, with a plurality of modular cavities connected in series from said first coaxial connector. In a second embodiment, first and second coaxial connectors are provided with a plurality of ports connected in series from said first coaxial connector to said second coaxial connector.

Each modular cavity contains a module switch, which provides conductivity between the input and output of each respective modular cavity. In particular, the module switch is closed when the modular cavity is empty, and opened when a module is inserted into the modular cavity. Since the module switch is shorted when the modular cavity is empty, the CATV distribution network is configured by plugging or unplugging desired modules. In addition to subscriber taps (tap modules) of various values and with various numbers of subscriber ports, a plug in module may be an amplifier, an equalizer, a terminating load or a mid-module output. Blank modules may be either the shorting type (not operating the module switch) or non-shorting type (operating the module switch).

The present invented housing accommodates various flexible electrical and mechanical modular configurations of CATV components, both for initial CATV distribution system designs and subsequent reconfigurations in the field. For example, an installation may start with very few subscribers and later be expanded to additional subscribers by installing additional 2, 4 or 8 port subscriber taps without disrupting service to the existing subscribers. For new subscribers with longer drop lines, subscriber taps with smaller values may be plugged into an available modular port.

If the RF signal becomes too attenuated or sloped to supply more taps, a modular cavity may be used to insert an amplifier or equalizer into the series connection. Terminating taps or modules may be installed in any modular cavity and moved at will to make room for additional intervening taps. The modular housing may further be used for series connection beginning at either end or from both ends simultaneously.

The multiple cavity, multiple port modular CATV housing permits replacement of defective or damaged taps without replacing the whole tap. The installer may revalue a tap by installing a module with different tap values as the design parameters of the cable system change.

BRIEF DESCRIPTION OF THE DRAWINGS

FIG. 3 is a detail cross-sectional assembly drawing of two modular cavities with corresponding module switches and plug in subscriber tap modules in accordance with the present invention.

FIG. 4 is a cross-sectional assembly drawing of a multiple cavity, multiple port modular CATV housing including a plurality of modular cavities, module switches and plug in subscriber tap modules in accordance with the present invention.

FIG. 5 is a top transparent view of a multiple cavity, multiple port modular CATV housing embodying the present invention.

FIG. 6 is a schematic diagram of a multiple port modular CATV housing in accordance with the present invention.

FIG. 7 is a detail view of a module switch for use in a multiple cavity, multiple port modular CATV housing in accordance with the present invention.

FIGS. 8–14 illustrate various combinations of plug in modules including terminating and non-terminating subscriber taps, blank modules, amplifier modules and equalizer modules for use in conjunction with the present invention.

DETAILED DESCRIPTION

Figure 1:
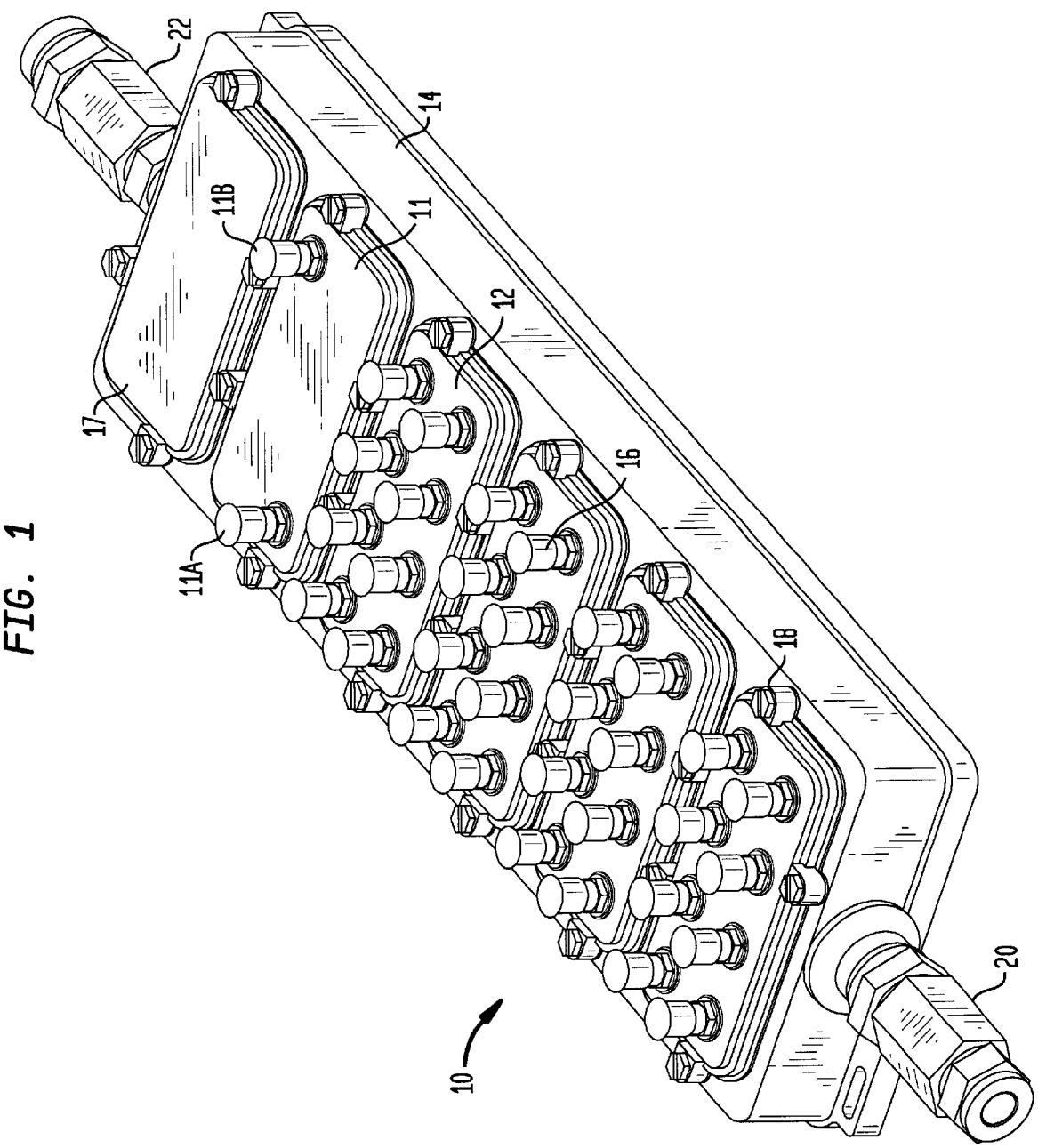
FIG. 1 is a perspective view drawing of a multiple cavity, multiple port modular CATV housing in accordance with the present invention.
Figure 2:
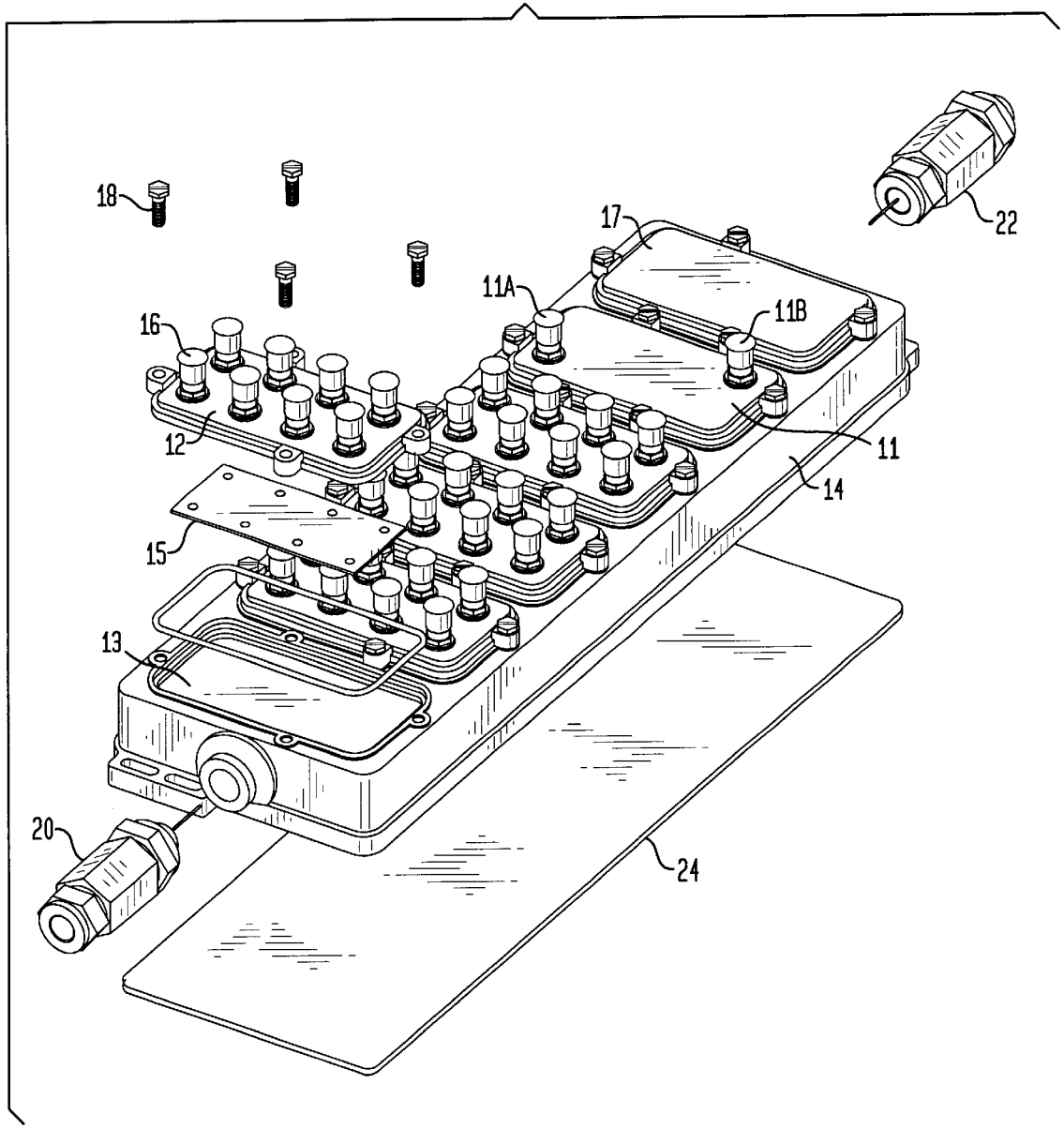
FIG. 2 is a perspective exploded view drawing of a multiple cavity, multiple port modular CATV housing in accordance with the present invention.

A multiple cavity, multiple port modular CATV housing 10 in FIG. 1 includes a frame 14, a first coaxial connector 20 and a second coaxial connector 22. As shown in further detail in FIG. 2, the frame 14 has a plurality of cavities 13 into which a plurality of plug in modules are inserted. Each plug in module is an assembly of a top plate 12, one or more coaxial connectors 16 and a circuit board 15. Some types of plug in modules 17 have no coaxial connectors (amplifiers, equalizers and blank module covers), while other types of plug in modules 11 may have one or two coaxial connectors 11A, 11B (outputs to external connectors) Each type of plug in module 12, 11, 17 is inserted into an appropriate modular cavity 13 and secured by fasteners 18. The frame 14 also houses a multiple cavity circuit board 25 (shown in FIG. 4). A housing bottom plate 24 engages frame 14 to enclose the multiple cavity circuit board 25 and form a sealed unit.

The relationship of the multiple cavity circuit board 25 to frame 14 is shown in FIG. 4. At one end of the multiple cavity circuit board 25 is a first coaxial connector 19A and seizure mechanism 21A. At the other end of the multiple cavity circuit board 25 is a second coaxial connector 19B and seizure mechanism 21B. Either the first coaxial connector 19A or the second coaxial connector 19B may be used for RF signal input or output. In addition, both coaxial connectors 19A, 19B may be simultaneously used for RF signal input at both ends of frame 14.

The following terms are used herein as follows:

A "multiple cavity, multiple port modular CATV housing" means the assembly of modular cavities including a housing frame 14.

A "modular cavity" is an opening for receiving a plug in module.

A "plug in module" or a "module" is an assembly that plugs into a modular cavity. A plug in modules may be a subscriber tap, an amplifier, an equalizer, a terminating load, an output module, a shorting blank module or a non-shorting blank module.

A "subscriber tap" is a plug in tap module that has multiple subscriber ports.

"Subscriber ports" are coaxial connector outputs from a subscriber tap for connection to corresponding subscriber coaxial drop lines. For example, an 8-port subscriber tap has 8 subscriber ports that attach to 8 corresponding subscriber drop lines.

A typical subscriber tap module is illustrated in FIG. 3. The subscriber tap module consists of a tap plate 12, a plurality of subscriber ports (coaxial connectors 16), a circuit board 15, a pair of signal pins 30A, 30B, and a pair of switch pins 32A, 32B. The circuit board 15 is held in place with screws to tap plate 12. The switch pins 32A, 32B and signal pins 30A, 30B are attached to the circuit board 15. The coaxial connectors 16 are mounted on the tap plate 12 for connection to the circuit board 15.

A module switch 44 (comprising two flexible arms 44A, 44B) is mounted on the multiple cavity circuit board 25, which is secured within the frame 14. The module switch consists of the flexible conductive member 44 and two signal pin contacts 41A, 41B, which are mounted on the multiple cavity circuit board 25. To operate the module switch 44, two holes 38A, 38B are provided in the circuit board 25 above the module switch arms 44A, 44B. A bottom detail view of the module switch 44 is shown in FIG. 7. (FIG. 3 shows the side view of the module switch).

The module switch is attached to the multiple port circuit board 25 by a fastener 42. Each arm 44A, 44B of the module switch 44 exerts a force so as to press switch contacts 40A, 40B at the ends of the module switch arms 44A, 44B against the respective signal pin contacts 41A, 41B. Thus, when no module is inserted into the modular cavity, module switch 44 provides a short circuit between input and output signal pin contacts 41A, 41B via module switch 44.

On the left side of FIG. 3, the subscriber tap module is shown inserted into the modular cavity opening in the frame 14. In the inserted position, the plug in module signal pins 30A, 30B contact the signal pin contacts 41A, 41B on the circuit board 25 respectively. At the same time, switch pins 32A, 32B, pass through holes 38A, 38B respectively deflecting both module switch arms 44A, 44B. The deflection of module switch arms 44A, 44B moves the switch contacts 40A, 40B so as to open the short circuit between signal pins 41A, 41B.

Circuit board 15 inside the plug in module contains a standard CATV tap circuit. In a tap, a portion of the RF signal at input signal pin 30A is tapped by a directional coupler and divided in an internal splitter network to feed RF signal to the coaxial connectors 16. The remaining portion of the input RF signal is coupled to output pin 30B. Thus, when the plug in tap module is inserted into the modular cavity, circuit board 15 provides signal continuity between input signal pin contact 41A and output signal pin contact 41B on circuit board 25.

In the inserted position, the top plate 12 of the module is fastened to the frame 14 by screw fasteners 18. The bottom of plate 12 has a recessed area 34 that engages protrusion 36 on the frame 14 to align the module with the frame and contains a stainless steel mesh RFI gasket 34A eliminating RF radiation or ingress. Frame 14 has a recessed area 51 that engages protrusion 52 and contains a rubber environmental sealing gasket 50. Added structural strength and stability is provided by the signal pins 30A, 30B, which contact the multiple cavity circuit board 25 and the switch pins 32A, 32B, which are seated in openings 38A, 38B in the multiple cavity circuit board 25.

The relative length of the signal pins 30A, 30B and the switch pins 32A, 32B is selected so that the module switch 44 provides for "make before brake" operation upon module insertion and removal. That is, to avoid service interruption to downstream subscribers upon module insertion, the module signal pins 30A, 30B first "make contact" with the circuit board signal pin contacts 41A, 41B, before deflecting the module switch arms 44A, 44B to open the module switch 44 ("break contact"). Similarly, upon removal of the module, the module switch arm 44A, 44B first "make contact" so as to short signal pin contacts 41A, 41B, before breaking contact between signal pins 30A, 30B and the signal pin contacts 41A, 41B. In such manner, the signal to downstream subscribers is not interrupted upon removal or insertion of a plug in module.

The circuit diagram of a multiple cavity, multiple port modular CATV housing (with power passing) is shown in FIG. 6. Each modular cavity 6A–6F includes a normally shorted module switch. For example, modular cavity 6C includes module switch 44 having bridging signal pin contacts 41A and 41B. When a module is inserted into the modular cavity 6C, switch 44 opens the conductive path between signal pin contacts 41A and 41B.

To provide power for an active component, such as an amplifier, input 60 volt, 60 cycle AC at coaxial input connector 20 is separated from the RF signal path by capacitor C1 and inductive choke L1. A separate power bus 61 caries power to all modular cavities 6A–6C. By way of example, modular cavity 6F includes a power pin contact 63 on the circuit board 25 that is similar to the signal pin contact 41A in FIG. 3. An amplifier plug in module has a power pin (similar to the signal pin 30A in FIG. 3) to engage the power pin contact 63 on the circuit board 25. In FIG. 6 power passing components C1 and L1 are illustrated as being internal to the multiple cavity, multiple port modular CATV housing. In the alternative, capacitor C1 and inductor L1 may be located external to the multiple cavity, multiple port modular CATV housing, in which case an additional input power terminal would be provided on the housing frame 14. If no active components are contemplated, then capacitor C1, inductive choke L1, the power bus 61, power pin contacts 63 (and any input power terminal) may be omitted. In the latter case the multiple cavity, multiple port modular CATV housing would be non-power passing, and care must be taken to block out 60 volt, 60 cycle power before applying RF signal to the input coaxial connector.

A top transparent view of a multiple cavity, multiple port modular CATV housing showing the spatial relationship between the housing frame 14 each modular cavity 5A–5F, multiple cavity circuit board 25, is shown in FIG. 5. Module switch 44 in module cavity 5D is positioned longitudinally along the center axis of the multiple cavity, multiple port modular CATV housing.

In FIG. 4, a side cross sectional view of a multiple cavity, multiple port modular CATV housing shows a frame 14 having a plurality of modular cavities 4A–4F to receive a corresponding plurality of plug in modules. In particular, modular cavities 4B, 4C, 4E, and 4F are illustrated with various types of modules inserted. Modular cavities 4A and 4D are empty. Modular cavities 4C and 4E contain terminating or non-terminating subscriber tap modules (or signal output modules). Modular cavity 4F contains a blank module without switch pins or signal pins, which is a shorting type blank module. A shorting type blank module is essentially a cover plate, which serves primarily to seal the interior of the multiple cavity, multiple port modular CATV housing, without interrupting the internal series circuit.

Modular cavity 4B contains a module without coaxial connectors, but with switch pins and signal pins. Thus, the plug in module in modular cavity 4B could be any one of a number of types of modules. The plug in module in cavity 4B could be an amplifier, an equalizer or a non-shorting type blank module. The various types of system configurations possible using the multiple cavity, multiple port modular CATV housing are illustrated in FIGS. 8–14.

Figure 8:
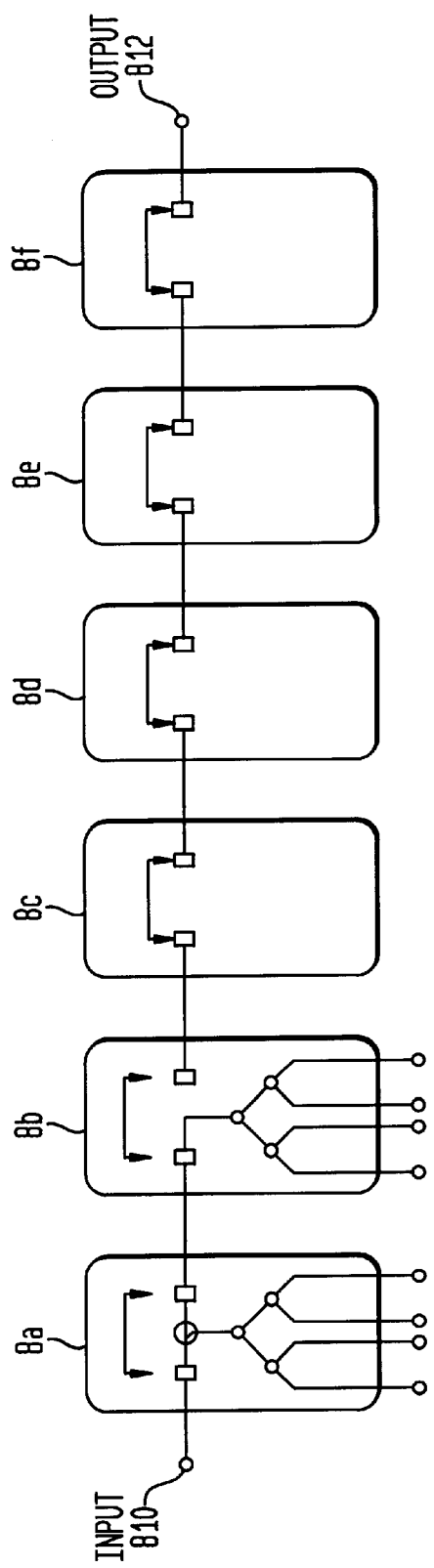

FIG. 8: 8 Subscriber Ports, Terminating.

Modular cavity 8A contains a 4-port tap, and modular cavity 8B contains a 4-port terminating splitter. The module switches in modular cavities 8A and 8B are open. Thus, the input RF signal on input terminal 810 is divided among 8 subscriber ports. Since cavity 8B contains a terminating splitter, no output RF signal is provided at output terminal 812. Removing the terminating tap from cavity 8B and inserting one or more different plug in modules will allow flexible modification of the distribution arrangement in the field.

Figure 9:
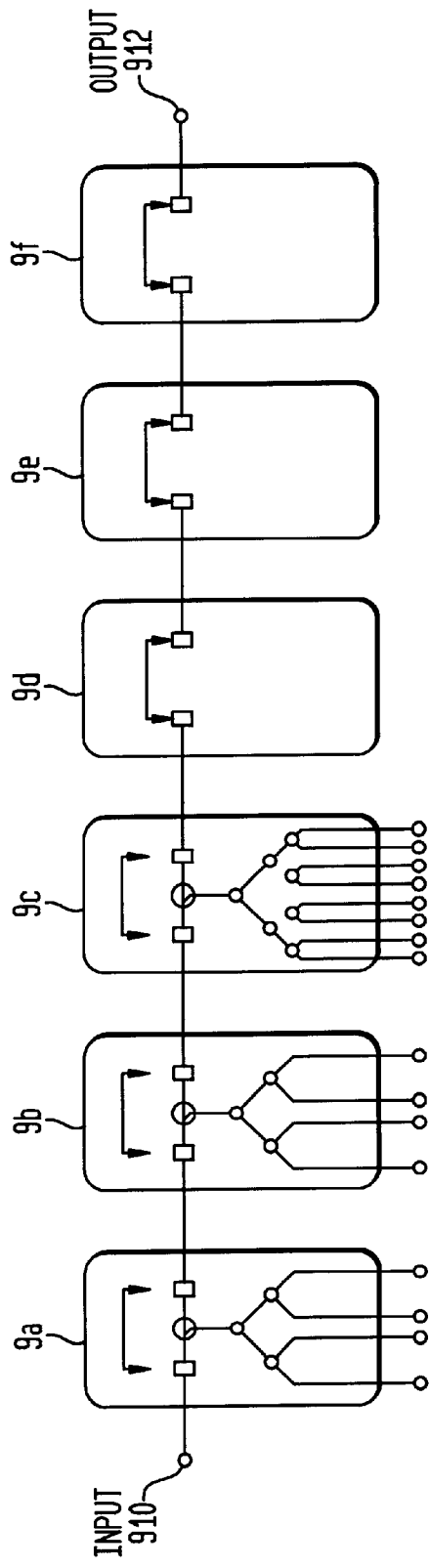
Figure 12:
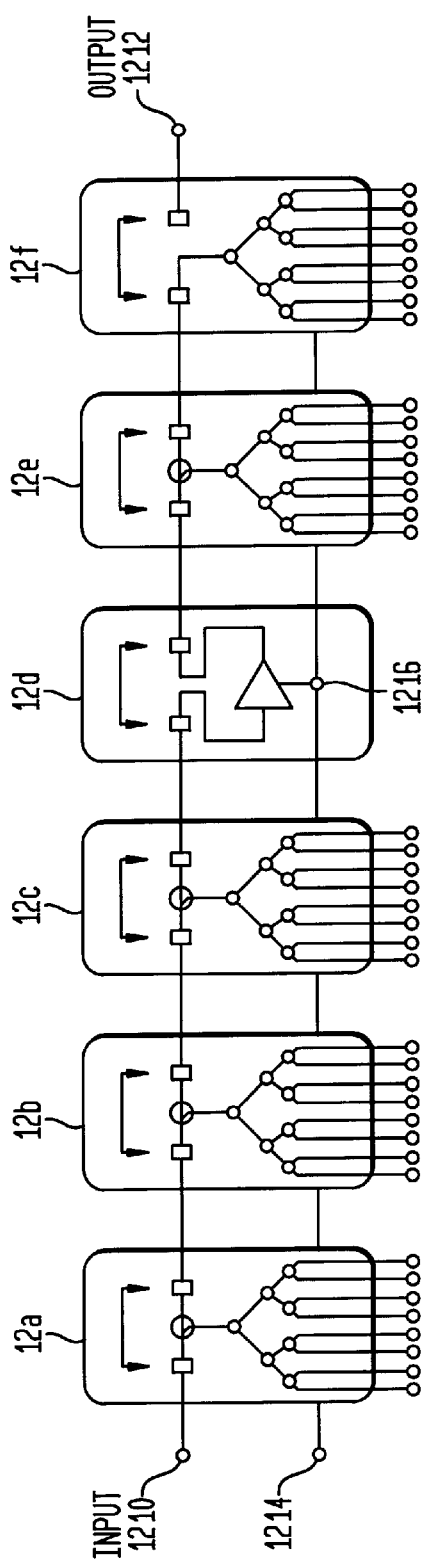

FIG. 9: 16 Subscriber Ports, Non-Terminating.

In FIG. 9, the arrangement of FIG. 8 is expanded to additional subscribers. As before, modular cavities 9A and 9B contain 4-port taps. Modular cavity 9C contains a non-terminating 8-port tap. The tap values in any modular cavity, e.g., 9A, may be the same or different than the tap values in any of the other modular cavity, e.g., 9B or 9C. Due to the presence of the plug in modules, the module switches in modular cavities 9A, 9B and 9C are open. At the same time, the module switches in modular cavities 9D–9F are closed (shorted condition). Thus, the input RF signal on input terminal 910 is divided among 16 subscriber ports, and the remaining RF signal is provided at output terminal 912. The plug in modules need not be installed in adjacent modular cavities.

FIG. 10: 22 Subscriber Ports, Non-Terminating.

In FIG. 10, an 8-port tap is installed in modular cavity 10A. A 4-port tap is installed in modular cavity 10E and an additional 2-port tap and 4-port tap is installed in modular cavities 10C, 10E and 10F respectively. A middle modular cavity 10D is empty and available for future expansion. Thus, the input RF signal on input terminal 1010 is divided among 22 subscriber ports, and the remaining RF signal is provided at output terminal 1012.

FIG. 11: Dual Input 22 Subscriber Ports. 12 Subscriber Ports Terminating and 10 Subscriber Ports Terminating.

The flexibility of the multiple cavity, multiple port modular CATV housing is illustrated in FIG. 11, in which the coaxial connector output 1112 is used as a second input terminal. Modular cavity 11A contains a 4-port tap and modular cavity 11B contains an 8-port terminating tap. A terminating tap is similar to a terminating splitter, except that the former has a directional coupler and terminating impedance 1114, while the latter terminating splitter has neither directional coupler nor terminating impedance. Modular cavity 11F contains an 8-port tap and modular cavity 11E contains a 2-port terminating splitter. Thus, the input RF signal on input terminal 1110 is divided among 12 subscriber ports, while the input RF signal on input terminal 1112 is divided among 10 subscriber ports, for a total of 22 subscriber ports FIG. 12: 40 Subscriber Ports Terminating.

Modular cavities 12A, 12B and 12C each contain an 8-port tap. In the event that the RF signal at input terminal 1210 becomes too attenuated after three 8-port taps, an amplifier module may be inserted into modular cavity 12D to boost the remaining RF signal. The amplifier module is powered from a power pin 1216, which is coupled to all modular cavities 12A–12F by a separate power buss 61 and receives power via a power form (such as 60 volt, 60 cycle AC) applied to input connector 20. Power is separated from the RF signal path by capacitor C1 and inductive choke L1. The amplified RF signal thereafter has sufficient level to provide for two 8-port taps in modular cavities 12E and 12F. If the RF signal at input terminal 1210 were sufficiently strong, an amplifier would not be needed, and modular cavity 12D would also contain an 8-port tap instead of an amplifier module. The 8-port tap in modular cavity 12F is a terminating splitter, which has no remaining RF signal for output terminal 1212.

Figure 13:
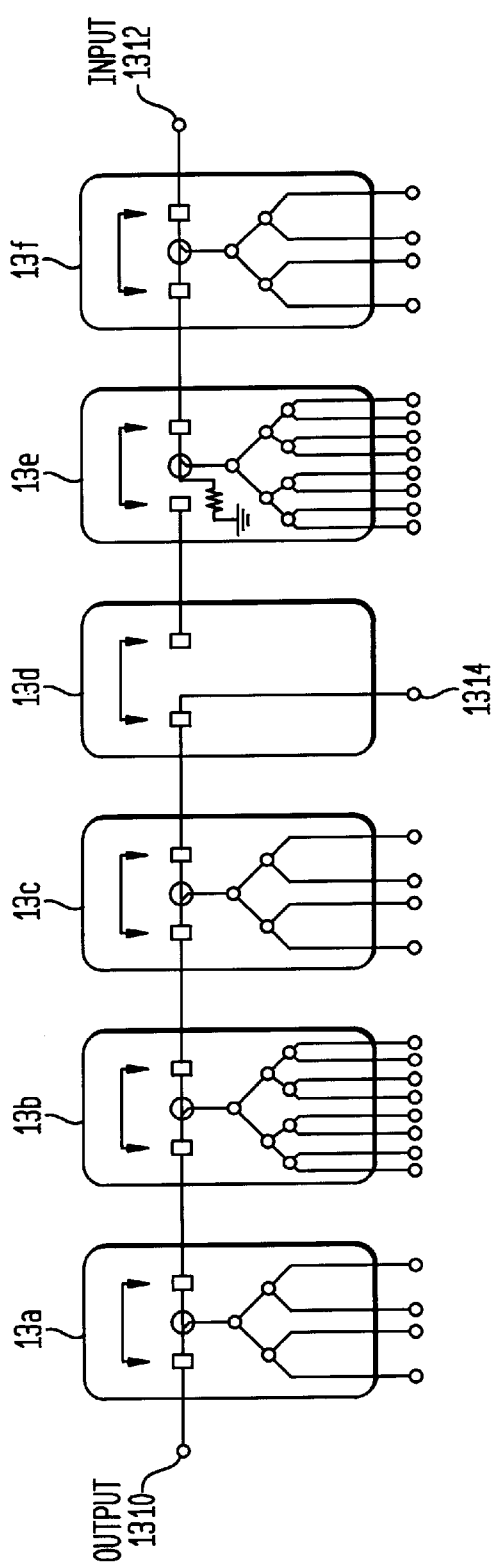

FIG. 13: Dual Input 28 Subscriber Ports. 16 Subscriber Ports Non-Terminating and 12 Subscriber Ports Terminating.

The further flexibility of the multiple cavity, multiple port modular CATV housing is illustrated in FIG. 13, in which the coaxial connector output 1312 is used as a second RF input terminal and a mid-housing cavity provides an additional RF output terminal. In particular, a signal output module having at least one coaxial output 1314 is installed in modular port 13D.

Modular cavities 13A, 13B and 13C contain a 4-port tap, an 8-port tap and a 4-port tap respectively. The output of the 4-port tap in modular tap 13C is input to the output module 13D. Thus, the input RF signal on input terminal 1310 is divided among 16 subscriber ports, and the remaining RF signal is provided at output terminal 1314.

Coaxial connector 1312 is used as an input terminal. Modular cavity 13F contains a 4-port tap and modular cavity 13E contains an 8-port terminating tap. Thus, the input RF signal on input terminal 1312 is divided among 12 subscriber ports, which combined with the 16 subscriber ports from modular cavities 13A, 13B and 13C, is a total of 28 subscriber ports.

Figure 14:
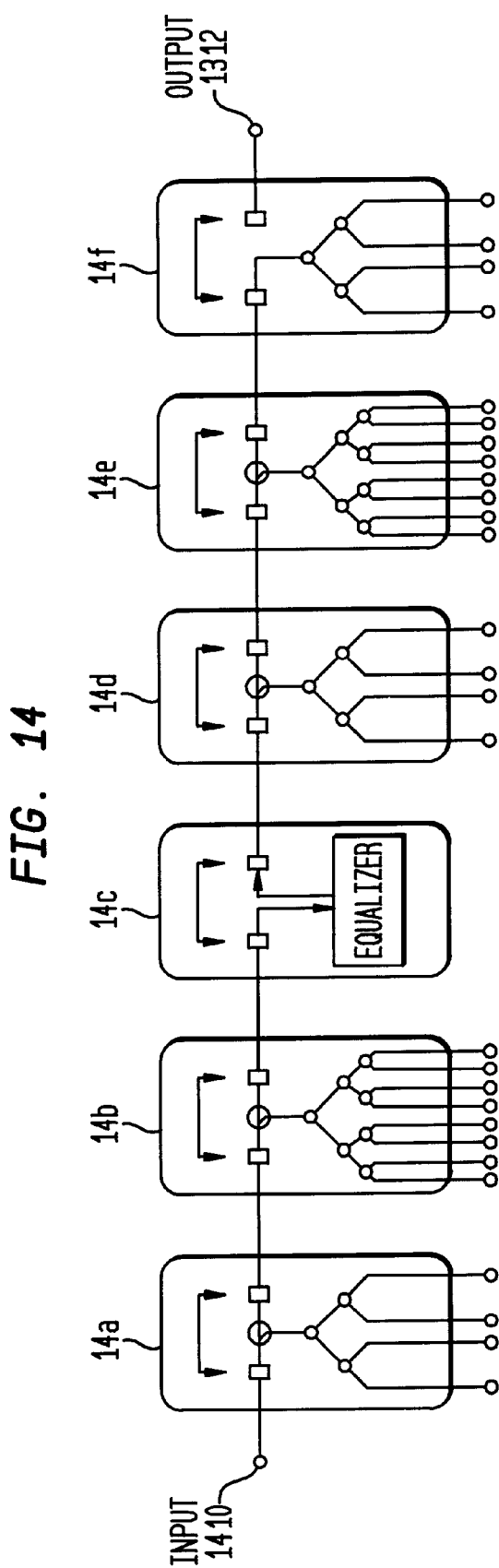

FIG. 14: 28 Subscriber Taps Terminating

Coaxial cable and RF circuits such as directional couplers attenuate the higher RF frequencies more than the lower RF frequencies. In situations where the higher RF frequencies become much more attenuated relative to the lower RF frequencies (a spectral tilt), a passive equalizer having an inverse spectral tilt is used to equalize all signals in the spectrum. In FIG. 14, the multiple cavity, multiple port modular CATV housing accommodates an equalizer module in module cavity 14C.

In FIG. 14, a 4-port tap is installed in modular port 14A and an 8-port tap is installed in modular cavity 14B. The RF output signal from the 8-port tap in modular cavity 14B is connected to the equalizer in modular cavity 14C which provides a passive (filter)?? inverse frequency tilt response in the RF spectrum. After the equalizer, the multiple cavity, multiple port modular CATV housing contains a 4-port tap, an 8-port tap and a 4-port terminating splitter in modular cavities 14D, 14E and 14F, respectively. Thus, the input RF signal on input terminal 1410 is divided among 28 subscriber ports, with equalization compensation provided for the RF signal supplied to the last 16 subscriber ports out of the 28 total subscriber ports.

What is claimed is:

1. A CATV housing comprising:
    a housing;
    a circuit board mounted in said housing;
    a first opening in said housing for accessing a first portion of said circuit board, said first opening and said first portion of said circuit board forming a first modular cavity;
    said first modular cavity further including a first module switch having respective first and second contacts, said first module switch being opened when a plug in module is inserted into said first modular cavity, said first module switch being closed when no plug in module is inserted into said first modular cavity;
    a second opening in said housing for accessing a second portion of said circuit board, said second opening and said second portion of said circuit board forming a second module cavity;
    said second modular cavity further including a second module switch having respective first and second contacts, said second module switch being opened when a plug in module is inserted into said second modular cavity, said second modular switch being closed when no plug in module is inserted into said second modular cavity;
    an input terminal coupled to said first contact of said first module switch; and
    said second contact of said first module switch being coupled to said first contact of said second module switch.

2. A CATV housing in accordance with claim 1, further comprising:
    an output terminal coupled to said second terminal of said second module switch.

3. A CATV housing in accordance with claim 1, wherein said first and second module switches are mounted on said first and second portions of said circuit board respectively.

4. A CATV housing in accordance with claim 3, wherein each of said first and second module switches further comprise:
    a flexible conductive member having first and second arms, said flexible conductive member being fastened to said circuit board at a point between said first and second arms.

5. A CATV housing in accordance with claim 4, wherein said circuit board further comprises first and second holes therethrough, said first hole in said circuit board positioned above said first arm of said flexible conductive member, said second hole in said circuit board positioned above said second arm of said flexible conductive member.

6. A CATV housing in accordance with claim 5, further comprising:
    a plug in module having first and second switch pins attached thereto, said first and second switch pins disposed so as to pass through said first and second holes in said circuit board when said plug in module is inserted into a modular cavity of said CATV housing.

7. A CATV housing in accordance with claim 6, wherein said first and second switch pins contact said first and second arms through said first and second holes in said circuit board to deflect said first and second arms respectively, thereby operating the module switch of said modular cavity.

8. A CATV housing in accordance with claim 7, wherein said plug in module further comprises first and second signal pins, said circuit board further comprises first and second signal contacts, said first and second signal pins contacting said first and second signal contacts respectively when said plug in module is inserted into said modular cavity.

9. A CATV housing in accordance with claim 8 wherein the relative length of said first and second switch pins and said first and second signal pins is selected so that said first and second signal pins make contact with said first and second signal contacts before said first and second switch pins deflect said first and second arms respectively, when said plug in module is inserted into said modular cavity.

10. A CATV housing in accordance with claim 9 wherein the relative length of said first and second switch pins, and said first and second signal pins, is selected so that said first and second signal pins brake contact with said first and second signal contacts after said first and second switch pins release said first and second arms respectively, when said plug in module is removed from said modular cavity.

11. A CATV housing in accordance with claim 1, further comprising:
   a power input terminal; and
   a power bus coupled to said power input terminal, said power bus being connected to said first and second modular cavities.

12. A CATV housing in accordance with claim 1, further comprising:
   a capacitor connected between said input terminal and said first contact of said first module switch;
   a power bus connected to said first and second modular cavities; and
   an inductor connected between said input terminal and said power bus.

13. A CATV housing comprising:
   a housing;
   a circuit board mounted in said housing;
   a plurality of openings in said housing for accessing a plurality of portions of said circuit board, each of said plurality of openings and plurality of portions of said circuit board forming a corresponding plurality of modular cavities;
   each of said plurality of modular cavities further including a respective module switch having respective first and second contacts, each said respective module switch being opened when a plug in module is inserted into said corresponding modular cavity, said each respective module switch being closed when no plug in module is inserted into said corresponding modular cavity; and
   an input terminal:
      said plurality of module switches being connected in series, with the second contact of each of said plurality of said module switches connected to the first contact of the next module switch respectively in said series of said plurality of module switches, and the first contact of the first module switch in said series being connected to said input terminal.

14. A CATV housing in accordance with claim 13, further comprising an output terminal, wherein the second contact of the last module switch in said series is connected to said output terminal.

15. A CATV housing in accordance with claim 13, wherein each of said plurality of module switches is mounted on a corresponding one of said plurality of portions of said circuit board respectively, and each of said plurality of module switches further includes a flexible conductive member having first and second arms, said flexible conductive member being fastened to said circuit board at a point between said first and second arms, said circuit board further comprises first and second holes therethrough, said first hole in said circuit board positioned above said first arm of said flexible conductive member, said second hole in said circuit board positioned above said second arm of said flexible conductive member.

16. A CATV housing in accordance with claim 15, further comprising:
   a plug in module having first and second switch pins attached thereto, said first and second switch pins disposed so as to pass through said first and second holes in said circuit board when said plug in module is inserted into a modular cavity of said CATV housing, wherein said first and second switch pins contact said first and second arms through said first and second holes in said circuit board to deflect said first and second arms respectively, thereby operating the module switch of said modular cavity, wherein said plug in module further comprises first and second signal pins, said circuit board further comprises first and second signal contacts, said first and second signal pins contacting said first and second signal contacts respectively when said plug in module is inserted into said modular cavity, wherein the relative length of said first and second switch pins, and said first and second signal pins, is selected so that said first and second signal pins make contact with said first and second signal contacts before said first and second switch pins deflect said first and second arms respectively, when said plug in module is inserted into said modular cavity, and wherein the relative length of said first and second switch pins and said first and second signal pins is selected so that said first and second signal pins brake contact with said first and second signal contacts after said first and second switch pins release said first and second arms respectively, when said plug in module is removed from said modular cavity.

17. A CATV housing in accordance with claim 13, further comprising:
   a power input terminal; and
   a power bus coupled to said power input terminal, said power bus being connected to said plurality of modular cavities.

18. A CATV housing in accordance with claim 17, further comprising:
   a capacitor connected between said input terminal and the first contact of the first module switch in said series;
   a power bus connected to said plurality of modular cavities; and an inductor connected between said input terminal and said power bus.

* * * * *